July 21, 1942.  W. C. RAMSEY  2,290,353
AUTOMOTIVE BRAKE
Filed Jan. 28, 1939  2 Sheets-Sheet 1
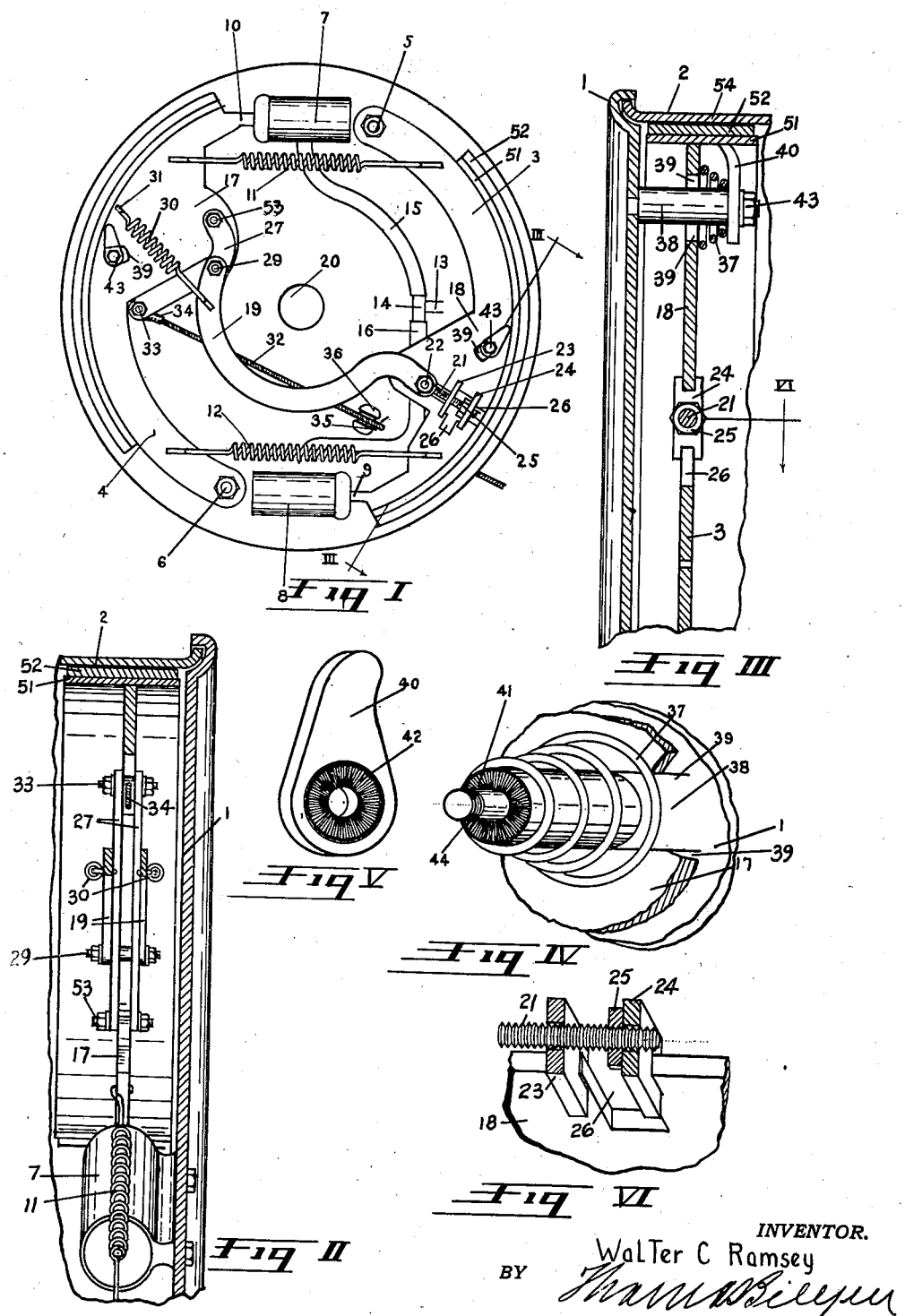
INVENTOR.
Walter C Ramsey
BY
ATTORNEY.

July 21, 1942.    W. C. RAMSEY    2,290,353
AUTOMOTIVE BRAKE
Filed Jan. 28, 1939    2 Sheets-Sheet 2
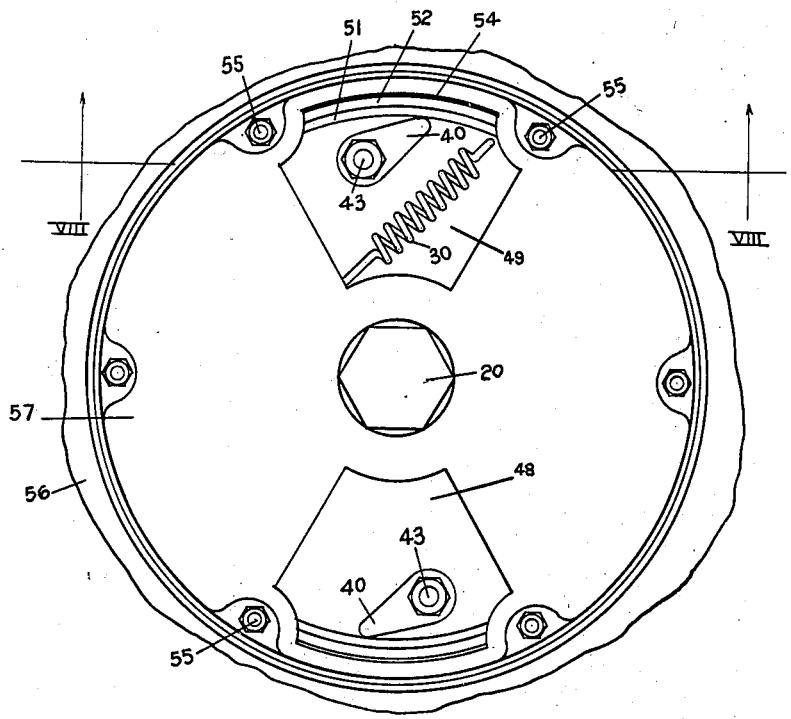
Fig VII
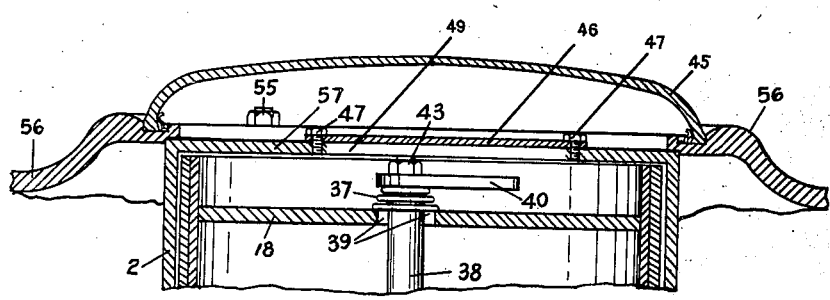
Fig VIII
INVENTOR.
Walter C. Ramsey
BY
ATTORNEY.

Patented July 21, 1942

2,290,353

UNITED STATES PATENT OFFICE 2,290,353

AUTOMOTIVE BRAKE

Walter C. Ramsey, Portland, Oreg.

Application January 28, 1939, Serial No. 254,901

4 Claims. (Cl. 188—79.5)

My invention relates to improvements in automotive brake adjustments.

Heretofore, adjustments for automobile brakes could be made at the back of the flanged plate; this required the adjustment be made from under the automobile.

Some adjustments were made by reaching through a small hole in the flanged plate, or the front cover plate with a screw driver or other tool.

To provide more convenient means for the adjusting of automobile brakes that are contained in the wheel hubs, I have invented adjustments designed to be operated from the front of the front of the wheel. I place hand adjusting holes through the front cover plate to permit reaching the adjustments from the outside of the wheel.

The primary object of my invention is to provide means for adjusting of the brakes contained in the wheel, without reaching under the automobile. Another object of my invention is to prevent the metal brake shoe being forced against the brake drum, when the brake lining is worn away.

With these and incidental objects in view, the invention consists in certain novel features of construction of parts, the essential elements of which are set forth in the appended claims, and a preferred form of embodiment of which is hereinafter shown with reference to the drawings which accompany and form a part of this specification.

The embodiment hereinafter shown is for the purpose of illustrating the operation of my invention only, and I do not confine the use of my improvements to any one type of automobile brake mechanism, as they are adaptable to the conventional types now in use, and various other types.

Fig. I is a plan view of the brake assembly. In this view the front cover plate is removed, in order that the internal construction of the brake assembly may show.

Fig. II is a fragmentary sectional side view of the wheel with the front cover plate removed. This view is taken on line II—II of Fig. I looking in the direction indicated and is primarily made to illustrate the correlated parts disposed between the hydraulic actuating mechanism and the manually actuated mechanism.

Fig. III is a fragmentary side view of the mechanism illustrated in Fig. I looking in the direction indicated.

Fig. IV is a perspective view of the conical spring that is used for positioning the brake shoe carrier to prevent same from rattling, and from riding the front cover plate. The conical spring is shown in position on the stop post that prevents the metal brake shoe being forced against the brake drum, when the brake lining is worn away.

Fig. V is a perspective plan view of the adjusting lug that limits the retracting movement of the brake shoe.

Fig. VI is a perspective sectional plan view of the supporting brackets and the adjusting screw which abuts the end of the linkage between the respective brake shoe carriers and is taken on line VI—VI of Fig. III, looking in the direction indicated.

Fig. VII is a plan view of the front cover plate for the brake mechanism housing, with the cover plates for the hand adjusting holes removed.

Fig. VIII is a sectional view taken on line VIII—VIII of Fig. VII looking in the direction indicated, and shows the front cover plate and an adjusting hole cover plate assembled.

Like reference characters refer to like parts throughout the several views.

1 is the flanged plate of the axle housing. 2 is the brake drum. The flanged plate, the brake drum, and the complete brake shoe assemblies 3 and 4 may be of any of the conventional types, or any other suitable type. The brake shoe assemblies 3 and 4 are applied to the brake drum at their ends 9 and 10 by pistons disposed in the cylinders 7 and 8 which are actuated by hydraulic fluid supplied through tubing and connections 13, 14, 15 and 16 in the conventional manner. Retracting springs 11 and 12 are attached at their ends in a suitable manner to the respective brake shoe carriers 17 and 18. These springs pull the brake shoe assemblies from contact with the brake drum when the pressure in the fluid is released in the hydraulic cylinders.

For emergency and parking use, I provide means for setting the brakes manually. I provide the link 19 curved to clear the axle 20 and secure it at one end at 29 to the bell crank 27, which is secured at 53 to the brake shoe carrier 17.

The other end of link 19 at 22 abuts adjusting screw 21 which is supported in the opening 26 that is disposed in the brake shoe carrier 18 by spaced threaded lugs 23 and 24 and the lock nut 25.

A pull applied in the conventional manner to the pull cable 32, draws it over the supporting block 36 through the opening 35.

When the ferrule 34 is connected to the bell crank 27 at 33, the thrust is applied at 22 and 53, forcing the brake shoes into contact with the brake drum, thus applying the brakes.

When the pull is released on cable 32, the springs 11 and 12 retract the respective brake shoe assemblies 3 and 4, and spring 30 through its connections to link 19 and brake shoe carrier 17 at 31, forces the end of link 19 to the bottom of opening 26 at 22, thus preventing rattle.

I provide a conical spring 37, which I mount upon a post 38 to hold the brake shoe against the flanged plate 1. This also prevents rattle of the parts. Post 38 has a reduced diameter and is threaded at the outer end to provide a shoulder on which to mount the adjusting lug 40 and is fastened to the flanged plate 1.

In order to permit a certain and limited amount of movement of the brake shoe assemblies 3 and 4 and to provide a stop to prevent the metal brake shoes being forced against the brake drum when the brake lining is worn away, I provide slots 39—39 in the brake shoe carriers 17 and 18. The slots 39—39 are of a length and so located with reference to posts 38—38, that the brake shoe carriers 17 and 18 may be fully retracted. When the brakes are applied, after the lining is worn from the brake shoes, the location of posts 38—38, with reference to slots 39—39, will cause the brake shoe carriers 17 and 18, at the inner ends of slots 39—39 to strike posts 38—38, and thus prevent the metal brake shoes being forced against the brake drum. To restrict the retractive movement of the brake shoe assemblies 3 and 4 and to secure the desired clearance between the brake shoe lining and the brake drum, when the brake is retracted, I provide lug 40, which I mount on the shoulder at the outer end of post 38 and secure it in place through the use of nut 43. From time to time, as the brake lining wears away, the nut 43 is loosened and lug 40 is sufficiently rotated to stop the brake shoe assembly at the then desired point. Nut 43 is then tightened. A suitable hub cap is shown at 45. A cover for one of the hand adjusting holes 48 or 49 is shown at 46 and a suitable means for securing same to the front cover plate is indicated at 47.

Two hand adjusting holes are shown, but any number desired may be used.

Slot 39, as shown on Fig. I, is the same length inside of post 38 (when the brake lining is in contact with the brake drum), as the thickness of the brake lining, therefore, when the brake lining is worn away, and the brake is applied, the brake shoe carrier at the inner end of slot 39 will strike post 38 and prevent the metal brake shoe being forced against the brake drum.

What I claim is:

1. In a device of the class described, the combination of a brake assembly, a carrying plate, a brake drum, a plurality of brake shoe carriers hingedly secured to the plate, a post, a conical spring disposed about the post, a slot disposed in the brake shoe carrier to permit a movement of the brake shoe carrier relative to the post, and a lug adjustably securable to the post and adapted for normally positioning the brake shoe carrier relative to the brake drum and to act as a stop to position the brake shoe relative to the brake drum and to limit the freedom of retractive movement of the brake shoe from the drum.

2. In a device as described, comprising in combination a wheel to be internally braked, a metal brake shoe with a brake lining secured to its outer face disposed in said wheel, a post with a shoulder at the outer end to mount an adjustment lug, an adjustment lug mounted on said shoulder and arranged to adjustably limit the retractive movement of the metal brake shoe, means for securing the lug to the post, said post serving to act as a stop limiting the outward movement of the metal brake shoe to prevent the metal brake shoe engaging the brake drum.

3. In a device as described, comprising in combination a wheel, a flanged plate, a brake shoe, a brake shoe carrier, a brake drum, a spring and a lug, a post secured to the flanged plate to act as a stop for the brake shoe to prevent the metal brake shoe being forced against the brake drum, a shoulder formed at the outer end of the post for adjustably mounting the lug to thereby predetermine the limit of travel of the brake shoe away from the brake drum, a spring to hold the brake shoe carrier in position, and a hand adjusting hole disposed in the face of the wheel through which the adjustment lug may be adjusted from the outside of the wheel.

4. In a device of the class described, a non-adjustable stop comprising in combination, a flanged plate, a brake drum, a metal brake shoe, a brake lining, a stud post, a brake shoe carrier with an accurate slot therein, and designed to carry a metal brake shoe with a brake lining secured to the outer face of the metal brake shoe, said brake shoe carrier being hinged at one of its ends to the flanged plate, a stud post inserted through said accurate slot in the brake shoe carrier and secured to the flanged plate, the accurate slot and stud post being such as to permit the brake shoe carrier being retracted, the location of said accurate slot and said stud post combining to form a direct non-adjustable stop which prevents the metal brake shoe being forced against the brake drum when the brake lining is worn away.

WALTER C. RAMSEY.